United States Patent
Farooq et al.

(10) Patent No.: US 10,315,619 B2
(45) Date of Patent: Jun. 11, 2019

(54) TWO-POINT SUPPLEMENTAL SEATBELT WITH SECONDARY BUCKLE

(71) Applicant: Ford Global Technologies, LLC, Dearborn, MI (US)

(72) Inventors: S. M. Iskander Farooq, Novi, MI (US); Mohammed Omar Faruque, Ann Arbor, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/435,709

(22) Filed: Feb. 17, 2017

(65) Prior Publication Data
US 2018/0236970 A1   Aug. 23, 2018

(51) Int. Cl.
*B60R 22/48*   (2006.01)
*B60R 22/02*   (2006.01)

(52) U.S. Cl.
CPC ........ *B60R 22/48* (2013.01); *B60R 2022/027* (2013.01); *B60R 2022/4816* (2013.01)

(58) Field of Classification Search
CPC .......................... B60R 22/48; B60R 202/4816
See application file for complete search history.

(56) References Cited

U.S. PATENT DOCUMENTS

| | | | |
|---|---|---|---|
| 5,135,257 A | | 8/1992 | Short |
| 5,483,221 A | * | 1/1996 | Mutter ................... B60R 22/48 180/268 |
| 6,278,358 B1 | * | 8/2001 | Spoto ..................... B60R 22/48 340/425.5 |
| 6,351,210 B1 | * | 2/2002 | Stewart ................... B60R 22/48 180/268 |
| 6,393,677 B1 | * | 5/2002 | Anscher ............. A44B 11/2549 24/615 |
| 6,871,876 B2 | * | 3/2005 | Xu ..................... A44B 11/2549 280/801.1 |

(Continued)

FOREIGN PATENT DOCUMENTS

| DE | 2813888 A1 | 10/1979 |
|---|---|---|
| DE | 9201946 U1 | 2/1992 |

(Continued)

OTHER PUBLICATIONS

Search Report from United Kingdom Intellectual Property Office dated Jul. 31, 2018 regarding Application No. GB1802481.0 (6 pages).

(Continued)

*Primary Examiner* — Omar Casillashernandez
(74) *Attorney, Agent, or Firm* — Frank MacKenzie; Bejin Bieneman PLC

(57) ABSTRACT

A vehicle includes seats having both a primary three-point seatbelt and a supplemental two-point seatbelt. Occupation of a first seat is determined. The three-point seatbelt is determined as being one of buckled and unbuckled. The two-point seatbelt is determined as being one of buckled and unbuckled. A warning signal is initiated upon determining that one of the seatbelts is unbuckled and the seat is occupied. The warning signal is terminated upon determining that both of the seatbelts are buckled and that the signal has been initiated.

20 Claims, 5 Drawing Sheets

(56) References Cited

U.S. PATENT DOCUMENTS

| | | | |
|---|---|---|---|
| 8,090,504 B2* | 1/2012 | Long | B60R 22/48 |
| | | | 180/286 |
| 8,448,308 B2* | 5/2013 | Mountz | A44B 11/2511 |
| | | | 24/321 |
| 8,451,110 B2* | 5/2013 | Takeshita | B60R 22/48 |
| | | | 200/85 R |
| 9,481,318 B2 | 11/2016 | Schmotzer et al. | |
| 9,669,796 B2* | 6/2017 | Ohno | B60R 22/06 |
| 2002/0089163 A1* | 7/2002 | Bedewi | B60R 22/02 |
| | | | 280/801.1 |
| 2004/0012242 A1 | 1/2004 | White | |
| 2008/0252058 A1* | 10/2008 | Gray | B60R 22/48 |
| | | | 280/801.1 |
| 2009/0093932 A1 | 4/2009 | McCall et al. | |
| 2009/0094810 A1 | 4/2009 | Rouhana et al. | |
| 2009/0115180 A1 | 5/2009 | Miyagawa | |
| 2009/0322507 A1 | 12/2009 | Aoki et al. | |
| 2010/0283593 A1 | 11/2010 | Miller et al. | |
| 2017/0120813 A1* | 5/2017 | Wilson | B60Q 9/00 |

FOREIGN PATENT DOCUMENTS

| | | |
|---|---|---|
| DE | 102008003644 A1 | 7/2009 |
| EP | 2108550 A1 | 10/2009 |
| FR | 2310139 A1 | 12/1976 |
| GB | 2395465 A | 5/2004 |
| GB | 2414444 A | 11/2005 |
| GB | 2556415 A | 5/2018 |
| JP | 2009057019 A | 3/2009 |

OTHER PUBLICATIONS

Search Report from United Kingdom Intellectual Property Office dated Dec. 13, 2018 regarding Application No. GB1802481.0 (3 pages).

* cited by examiner

TWO-POINT SUPPLEMENTAL SEATBELT WITH SECONDARY BUCKLE

BACKGROUND

A supplemental two-point seatbelt system used in addition to a three-point seat belt system may retain a passenger in a seat during an oblique impact of a vehicle. However, some two-point seatbelt systems have fit and comfort issues. There is a need for a supplemental two-point seatbelt system that is both comfortable and effective. There is also a need to provide a reminder system that will remind occupants to buckle both the primary three-point seatbelt system and the two-point seatbelt system.

SUMMARY

A computing device is programmed to initiate and terminate a seatbelt warning signal. The computer determines that a first seat is occupied. The computer, based on the condition of the first switch, determines that the first seatbelt is one of buckled and unbuckled. Further, the computer, based on the condition of the second switch, determines that the second seatbelt is one of buckled and unbuckled. The computer initiates the warning signal upon determining that one of the seatbelts is unbuckled and the seat is occupied, and terminates the warning signal upon determining that both of the seatbelts are buckled and that the signal has been initiated.

The computing device may be further programmed to determine that a vehicle in which the seat is disposed is in an operational mode prior to determining that the seatbelts are one of buckled and unbuckled.

The computing device, programmed to determine whether the vehicle is in the operational mode, may be further programmed to initiate the warning signal only after a lapse of a predetermined time between determining that the vehicle is in an operational mode and that one of the seatbelts is unbuckled.

The computing device may be further programmed to initiate and terminate a warning signal based on conditions of a second seat. The computer may, based on the condition of a first switch of the second seat, determine that the first seatbelt is one of buckled and unbuckled. Further, the computer may, based on the condition of the second switch of the second seat, determine that the second seatbelt is one of buckled and unbuckled. The computer may initiate the warning signal upon determining that one of the seatbelts of the second seat is unbuckled and the second seat is occupied, and may terminate the warning signal upon determining that both of the seatbelts of both seats are buckled and that the signal has been initiated.

The computing device may be further programmed to determine that a vehicle in which the seats are disposed is in an operational mode prior to determining that the seatbelts are one of buckled and unbuckled.

The computing device, programmed to determine whether the vehicle is in the operational mode, may be further programmed to initiate the warning signal only after a lapse of a predetermined time between determining that the vehicle is in an operational mode and that one of the seatbelts for either seat is unbuckled.

A method of determining and responding to a condition of seatbelts of a vehicle includes initiating and terminating a seatbelt warning signal. Whether a first seat is occupied is determined. That a three-point seatbelt is one of buckled and unbuckled is determined. That a two-point seatbelt is one of buckled and unbuckled is determined. A warning signal is initiated upon determining that one of the seatbelts is unbuckled and the seat is occupied. The warning signal is terminated upon determining that both of the seatbelts are buckled and that the signal has been initiated.

The method may further include the step of determining that the vehicle is in an operational mode prior to determining that the seatbelts are one of buckled and unbuckled.

The method, already including the step of determining that the vehicle is in an operational mode, may further include the step of initiating the warning signal only after a lapse of a predetermined time between determining that the vehicle is in an operational mode and that one of the seatbelts is unbuckled.

The method may further address the inclusion of a second seat, including steps to initiate and terminate the seatbelt warning signal responsive to the condition of the seatbelts of the second seat. That the second seat is occupied is determined. That a three-point seatbelt of the second seat is one of buckled and unbuckled is determined. That a two-point seatbelt of the second seat is one of buckled and unbuckled is determined. The warning signal is initiated when not already initiated upon determining that the second seat is occupied and that one of the seatbelts of the second seat is unbuckled. The warning signal is terminated upon determining that both of the seatbelts of both of the seats are buckled and that the signal has been initiated.

The method of may further include the step of further determining that the vehicle is in an operational mode prior to determining that the seatbelts are one of buckled and unbuckled.

The method, after determining that the vehicle is in an operational mode, may further include the step of initiating the warning signal only after a lapse of a predetermined time between determining that the vehicle is in an operational mode and that one of the seatbelts is unbuckled.

A seatbelt system includes a first seatbelt connected to a first retractor and an anchor. A first latch plate of the system is disposed on the seatbelt between the retractor and the anchor. A first buckle of the system selectively receives the latch plate. A second seatbelt of the system is connected to a second retractor and to a second latch plate. A second buckle is connected to the first seatbelt between the first latch plate and the anchor, selectively receiving the second latch plate.

The seatbelt system may further include a switch disposed in the second buckle. The switch has a first condition when the second buckle is in receipt of the second latch plate and a second condition when the second buckle is not in receipt of the second latch plate. The system may also include a wireless transmitter disposed in the second buckle and electrically connected to the switch to transmit data indicative of the condition of the switch.

The seatbelt system may include both a first switch disposed in the first buckle and a second switch in the second buckle. The first switch may have a first condition when the second buckle is in receipt of the first latch plate and a second condition when the first buckle is not in receipt of the second latch plate. The second switch may have a first condition when the second buckle is in receipt of the second latch plate and a second condition when the second buckle is not in receipt of the second latch plate.

The seatbelt system, given both the first switch and the second switch, may further have a first seat with the anchor and the first retractor disposed on a first side of the seat, and the first buckle disposed on a second side of the seat, and the second retractor fixed to a seatback of the seat. The system may also have a computing device, programmed to initiate and terminate a warning signal. The computer determines that the first seat is occupied. The computer may, based on the condition of the first switch, determine that the first seatbelt is one of buckled and unbuckled. Further, the computer may, based on the condition of the second switch, determine that the second seatbelt is one of buckled and unbuckled. The computer may initiate the warning signal upon determining that one of the seatbelts is unbuckled and the seat is occupied, and may terminate the warning signal upon determining that both of the seatbelts are buckled and that the signal has been initiated.

The seatbelt system, given that it includes the computing device, may be being further programmed to determine that a vehicle in which the seat is disposed is in an operational mode prior to determining that the seatbelts are one of buckled and unbuckled.

The seatbelt system, given that it includes the computing device and is able to determine whether the vehicle is in the operation mode, may be further programmed to initiate the warning signal only after a lapse of a predetermined time between determining that the vehicle is in an operational mode and that one of the seatbelts is unbuckled.

The seatbelt system, given that it includes the computing device, may also include a second seat with an associated first anchor and first retractor disposed on a first side of the seat, and an associated first buckle disposed on a second side of the seat. An associated second retractor is fixed to a seatback of the seat. The computing device is further programmed to initiate and terminate the warning signal. The computer determines that the second seat is occupied. The computer may, based on the condition of the first switch, determine that the first seatbelt of the second seat is one of buckled and unbuckled. Further, the computer may, based on the condition of the second switch of the second seat, determine that the second seatbelt of the second seat is one of buckled and unbuckled. The computer may initiate the warning signal upon determining that one of the seatbelts is unbuckled and the second seat is occupied, and may terminate the warning signal upon determining that both of the seatbelts are buckled and that the signal has been initiated.

The seatbelt system may further include the computing device being programmed to determine that a vehicle in which the seats are disposed is in an operational mode prior to determining that the seatbelts are one of buckled and unbuckled.

DETAILED DESCRIPTION

Introduction

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a driver's seat, facing a dashboard. In the Figures, like numerals indicate like parts throughout the several views.

Exemplary System Elements

An example restraint system 10 for a vehicle 12 includes seatbelts and airbags (not shown) for vehicle occupant locations, including, but not limited to, a first seat, e.g., a driver's seat 14A and a second seat, e.g., a front passenger's seat 14B. While the driver's seat 14A and the front passenger's seat 14B are shown on the left and the right side of the vehicle 12 respectively, the positions may be reversed.

The driver's seat 14A and the passenger's seat 14B are described herein consistent with vehicles having such designated positions. The driver's seat 14A is positioned to provide access to vehicle controls such as a start switch, e.g., an ignition switch, a steering wheel, a brake pedal and an accelerator pedal. Self-driving, i.e., autonomous, vehicles may not require the provision of such controls for use by a human driver. In self-driving vehicles, the driver's seat 14A and passenger's seat 14B may be identical to each other, except as may be desirable to facilitate entry into and exit from vehicle 12 and seats 14A and 14B.

Figure 1:
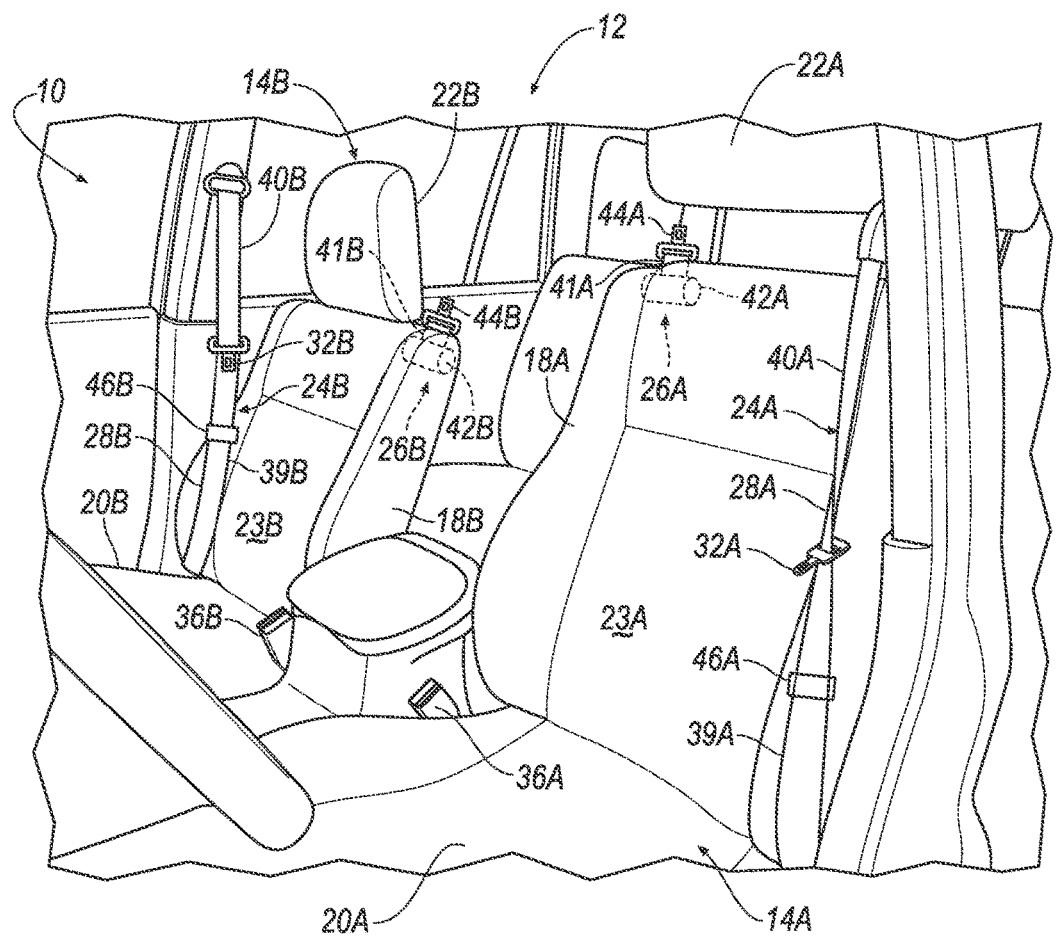
FIG. 1 is a perspective view of an interior of an example vehicle with example supplemental two-point seatbelt systems installed in the front seats.
Figure 2:
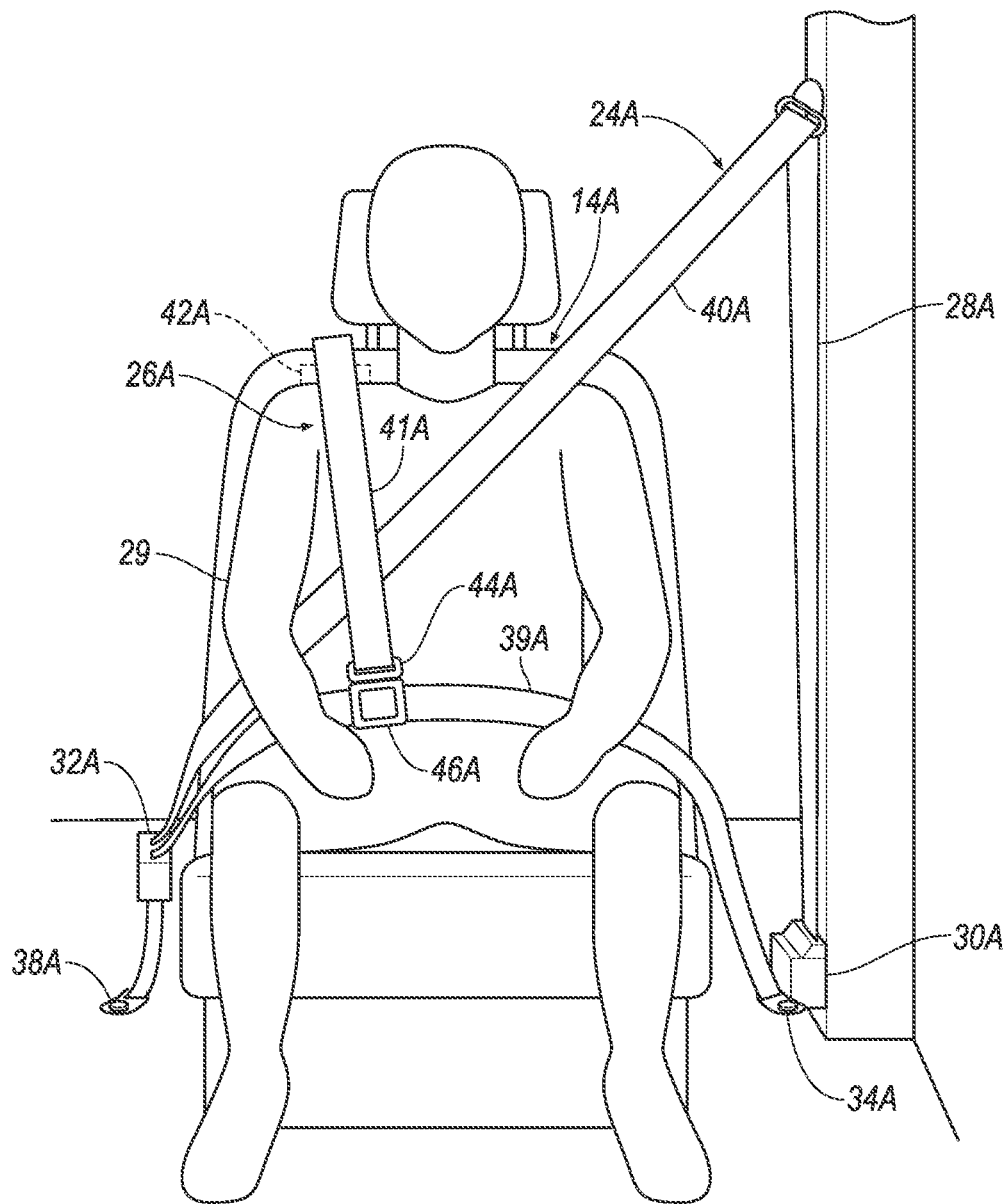
FIG. 2 is a rear-facing view of an occupied example left-hand seat with both a three-point seatbelt system and the two-point seatbelt system of FIG. 1 in a fully buckled condition.
Figure 3:
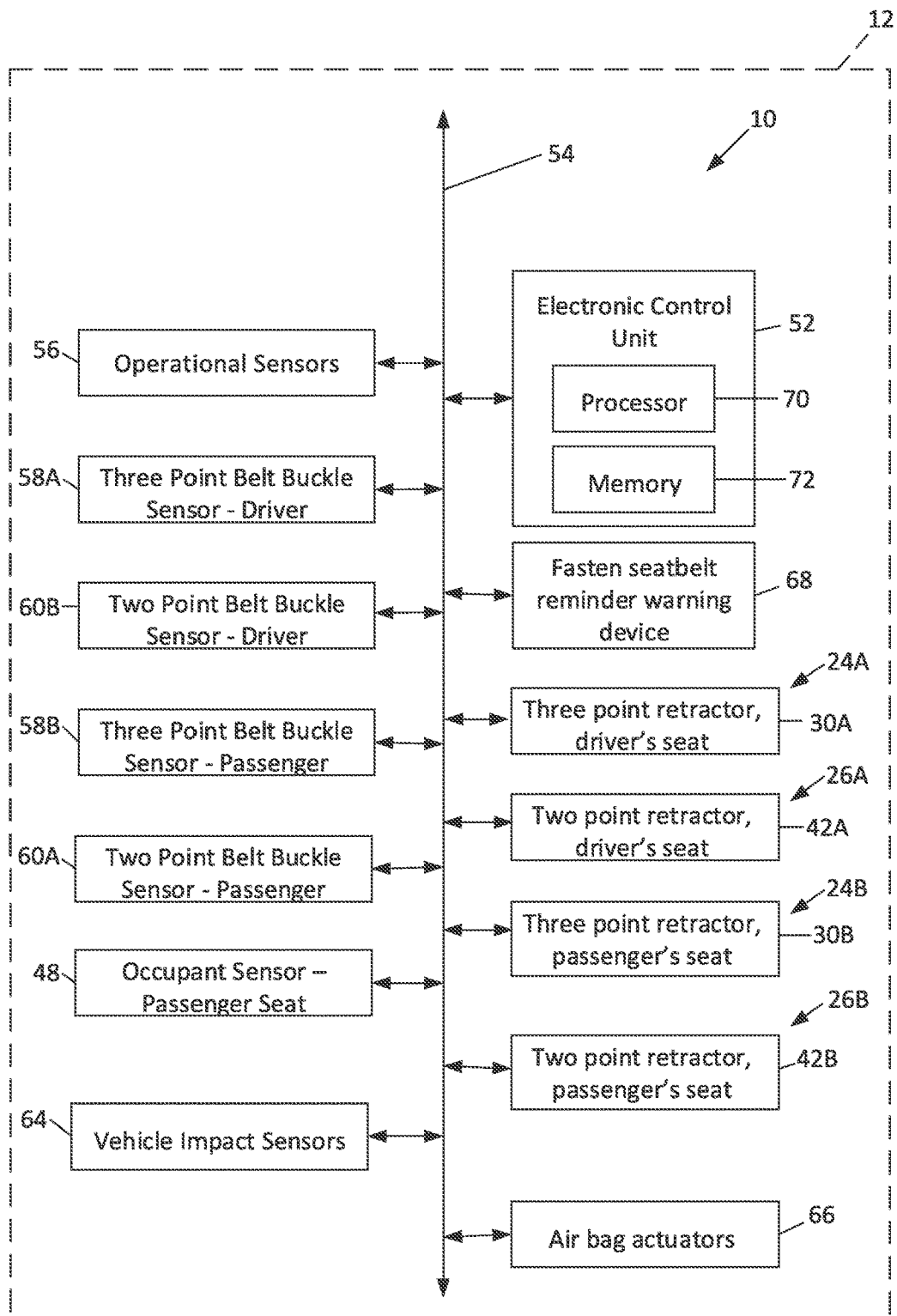
FIG. 3 is a block diagram of an example vehicle incorporating the system of FIG. 1.

The seats 14A and 14B as shown in FIGS. 1 and 2 are bucket seats, but alternatively may be a bench seat or another type of seat or seats. The seats 14A, 14B may be a mirror image of each other. Each seat 14A, 14B may respectively include a driver's seat back 18A, a passenger's seat back 18B, a driver's seat bottom 20A, a passenger's seat bottom 20B, a driver's head restraint 22A and a passenger's head restraint 22B. The following description will be of the driver's seat 14A with reference numerals followed by a suffix A. The passenger's seat 14B has its components identified with the same reference numerals with a suffix B consistent with the description of the driver's seat 14A and its components unless otherwise stated.

The head restraint 22A may be supported by the seat back 18A and may be stationary or movable relative to the seat back 18A. The seat back 18A may be supported by the seat bottom 20A and may be stationary or movable relative to the seat bottom 20A. The seat back 18A, the seat bottom 20A, and/or the head restraint 22A may be adjustable in multiple degrees of freedom. The seat back 18A, the seat bottom 20A, and/or the head restraint 22A may themselves be adjustable, in other words, adjustable components within the seat back 18A, the seat bottom 20A, and/or the head restraint 22A, and/or may be adjustable relative to each other.

The seat bottom 20A and/or the seat back 18A may include a seat frame (not shown) and a cushion covering 23A supported on the frame. The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc.

The cushion covering 23A may include upholstery and padding. The upholstery may be formed of cloth, leather, faux leather, or any other suitable material. The upholstery may be stitched in panels around the frame. The padding may be between the covering and the frame, and may be formed of foam or any other suitable supportive material.

The restraint system includes a three-point seatbelt system 24A and a two-point seatbelt system 26A. The three-point system 24A may be labeled as a primary restraint system and the two-point system may be labeled as supplementary restraint systems, as the two-point system 26A, as described herein, will not operate without the three-point seatbelt system 24A.

By three-point, it is meant that a three-point seatbelt, i.e., the webbing, 28A of system 24A is attached at three points around an occupant 29 when fastened: a three-point seatbelt retractor 30A, a three-point seatbelt latch plate 32A, i.e., a clip, and a three-point seatbelt anchor 34A. Anchor 34A may include an anchor plate fixed, as illustrated, to the vehicle structure, or alternatively, to the seat frame. The latch plate 32A selectively engages a three-point buckle 36A fixed to the vehicle structure or the seat frame by a three-point buckle mount 38A.

The seatbelt anchor 34A may attach one end of the three-point seatbelt 28A to one of the seat frame and the vehicle structure. The other end of the seatbelt 28A feeds into the retractor 30A, which may include a spool that extends and retracts the webbing. Retractor 30A may be fixed, as illustrated, to the vehicle structure, or alternatively, to the seat frame. The latch plate 32A slides freely along the webbing and, when engaged with the buckle 36A, divides the seatbelt 28A into a lap band 39A and a shoulder band 40A.

By two-point, it is meant that a two-point seatbelt 41A of the two-point system 26A is attached at two points about the occupant 29: a two-point seatbelt retractor 42A and a two-point seatbelt latch plate 44A. The latch plate 44A selectively engages a two-point buckle 46A disposed on the lap band 39A. One end of the two-point seatbelt 41A is fixed to the two-point seatbelt latch plate 44A. The other end of the seatbelt 41A feeds into the retractor 42A, which may include a spool that extends and retracts the seatbelt 41A. The two-point buckle 46A may be slidably disposed on the lap band 39A. When so disposed, the two-point buckle 46A may be selectively positioned along the lap band 39A by the occupant.

The restraint system 10 may include an occupant sensor 48 programmed to detect occupancy of the vehicle seat. The occupant sensor 48 may be visible-light or infrared cameras directed at the seat, weight sensors incorporated into the cushion covering 23A, sensors detecting whether a seatbelt for the seat is buckled or unspooled, or other suitable sensors.

System 10 also includes a computing device, e.g., an electronic control unit ("ECU") 52. The restrain system 10 may include a plurality of sensors and a plurality of actuators, connected to the ECU 52 via a vehicle network 54.

The sensors of the restraint system 10 may include a plurality of restraint system sensors. Restraint system sensors may include the occupant sensor 48, operational sensors 56, a three-point buckle sensor 58A, a two-point buckle sensor 60A, and vehicle impact sensors 64.

An occupant sensor 48 for the driver's seat 14A may or may not be incorporated into the seat 14A. Occupancy may be indirectly determined. An example of such indirect occupancy determination is to require simultaneous actuation of multiple vehicle controls, such as both pressing a brake pedal (not shown) in combination with pressing a start switch on a driver's side of the instrument panel.

Operational sensors 56 provide data signals evidencing that the vehicle 12 is in an operational mode, i.e., a state consistent with operation, i.e., movement. Example operational sensors may include the ignition switch of a car having an internal combustion engine. In a "run" position or condition, the ignition switch is indicative of a readiness of the vehicle to be operated. Another example operational sensor suited for an electrically powered vehicle may be include a switch, however managed, used by the occupant of the driver's seat 14A to indicate a readiness to begin operation of the vehicle.

Buckle sensors 58A and 60A may include a switch disposed in each of buckles 36A and 46A. Switches 58A and 60A may open and close responsive to an insertion of latch plates 32A and 44A respectively. Switches 58A and 60A provide data indicative of whether seatbelts 28A and 41A are in a buckled condition or an unbuckled condition. Connections to the ECU 52 may be made either by wire or wirelessly, as with Bluetooth signal transmitting equipment and methods, or with other wireless signal transmission technology. The use of wireless signal transmission technology is particularly helpful to the use of buckles 46A, as it allows buckle 46A to be place on the lap band 39A without a wire connecting to it.

The airbags of restraint system 10, when included, incorporate actuators 66, i.e., inflators, that may also connect to network 54. Actuators 66 may be actuated to deploy the associated airbags responsive to signals or data from the vehicle impact sensors 64. The vehicle impact sensors 64 may be accelerometers.

A reminder warning device, e.g., an electronic reminder chime 68, may also be connected to network 54. The chime 68 may be incorporated into an audio system of the vehicle 12. The chime may be used as a warning signal to a vehicle operator to indicate the unbuckled condition of one or both of the seatbelts 28A, 41A. Alternative warning signals may be provided by alternative devices and alternative forms including a message on a driver information screen, or a flashing light, or an audible spoken-language message in one or more languages. The different types of warnings may provide complementary notification to vehicle occupants of the need to buckle-up. For example, the audible chime may be combined with a message on the driver information screen advising that seatbelts need to be buckled. The chime 68 may be sounded when the vehicle 12 is occupied, is ready for operation and the seatbelts have not been buckled. A delay may be employed between the time at which the vehicle 12 is determined to be ready for operation and when the chime 68 is sounded. An example waiting period of predetermined time t may be set equal to a time T1 reasonably judged sufficient to buckle the seatbelts 28A, 28B, 41A, 41B, e.g., four seconds.

The ECU 52 may be comprised of a single computing device, as shown in FIG. 2, or may alternatively be comprised of a plurality of computers (e.g., ECUs), including, for example, a powertrain computer, itself potentially comprising an engine computer and a transmission computer, an infotainment computer, a chassis systems computer, a restraint system computer, a vehicle security computer, and so on. The ECU 52 includes an electronic processor 70 and an associated memory 72. System 10 may further include the vehicle network 54 including one or more wired and/or wireless communications media such as an example system Control Area Network ("CAN") bus or a Local Interconnect Network ("LIN") and/or other communications interface. Network 54 provides a transmission media between and connecting elements of the restrain system 10 including the ECU 52 and components and ancillary systems including, by way of example, operational sensors 56, three-point seatbelt buckle sensors 58A, 58B, two-point seatbelt buck sensors 60A, 60B, occupant sensor 48, three-point retractors 30A, 30B, two-point retractors 42A, 42B, reminder warning device 68, air bag actuators 66, and vehicle impact sensors 64.

Each of operational sensors 56, three-point seatbelt buckle sensors 58A, 58B, two-point seatbelt buck sensors 60A, 60B, occupant sensor 48, three-point retractors 30A, 30B, two-point retractors 42A, 42B, reminder warning device 68, air bag actuators 66, and vehicle impact sensors 64 are illustrated as connected directly to ECU 52 through network 54, but may alternatively or additionally be connected directly to ECU 52. Such connections may be made by wire, but the connections could alternatively be made wirelessly using Bluetooth or other signal transmission technologies.

The memory 72 of ECU 52 includes one or more forms of computer-readable media, and stores instructions executable by the processor 70 for performing various operations, including such operations as disclosed herein. Processor 70 may read and execute such instructions.

The memory 72 of ECU 52 also stores data. Data may include collected data that is collected from a variety of devices. In general, collected data may include any data from a map database, and any data that may be gathered by any data collection device including operational sensors 56, three-point seatbelt buckle sensors 58A, 58B, two-point seatbelt buck sensors 60A, 60B, occupant sensor 48, and vehicle impact sensors 64 and/or data computed from such data. The foregoing examples are not intended to be limiting. Other types of data collection devices may be used to provide data to ECU 52. Data may also include calculated data calculated in ECU 52 from collected data and from other calculated data.

The ECU 52 may be programmed to recognize when seats are occupied and when seatbelts are buckled and unbuckled and to initiate a warning signal when occupants are not completely buckled. Described below are substantially similar methods or processes 80A and 80B for use with, respectively, seats 14A and 14B of system 10 to recognize when not all of the seatbelts for all of the occupied seats are not buckled, and to initiate the warning signal when not all are buckled.

Processing

Figure 4:
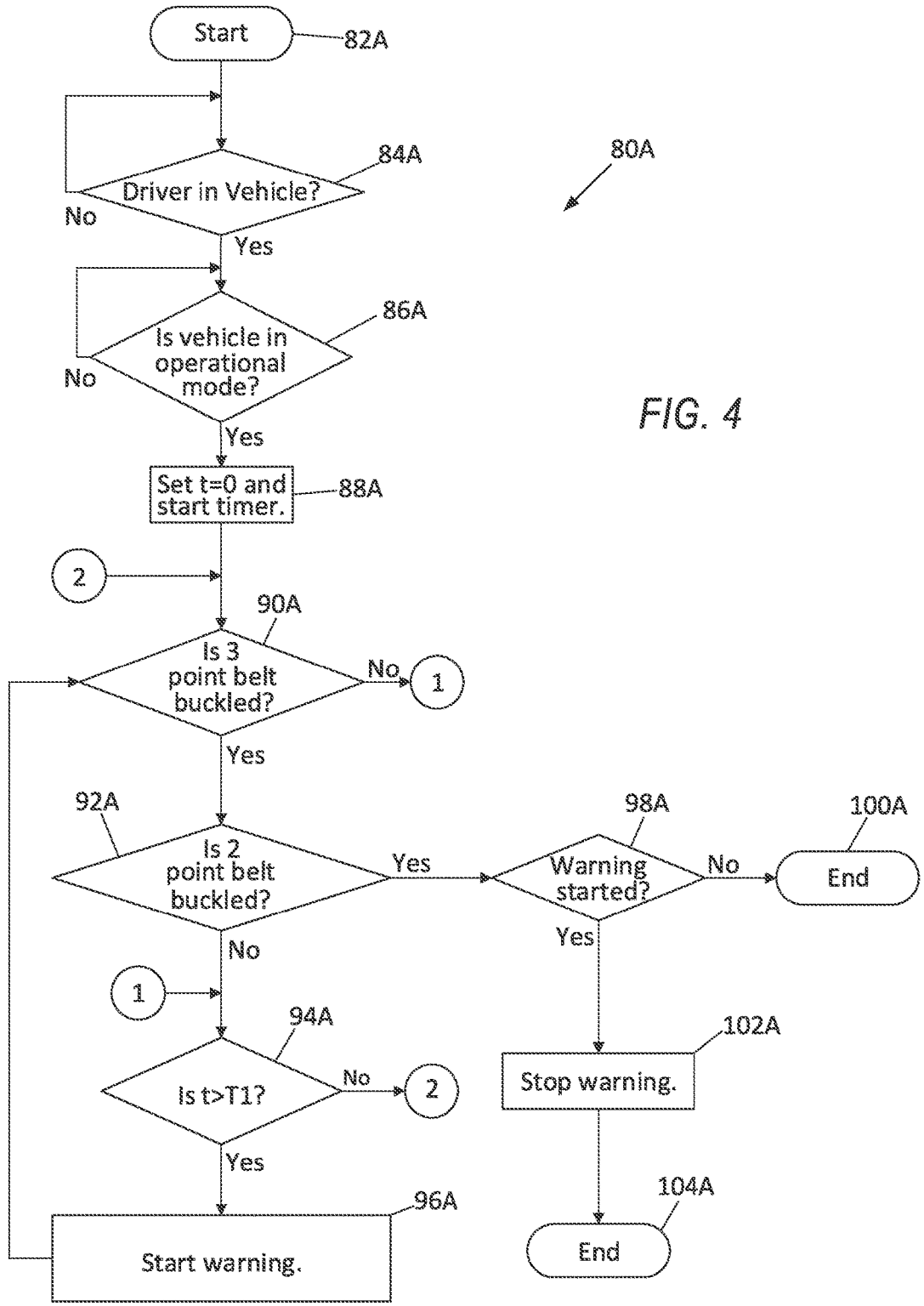
FIG. 4 is an example flow chart of a driver's seat portion of a process to sound a reminder chime for a combined primary three-point seatbelt system and supplemental two-point seatbelt system.
Figure 5:
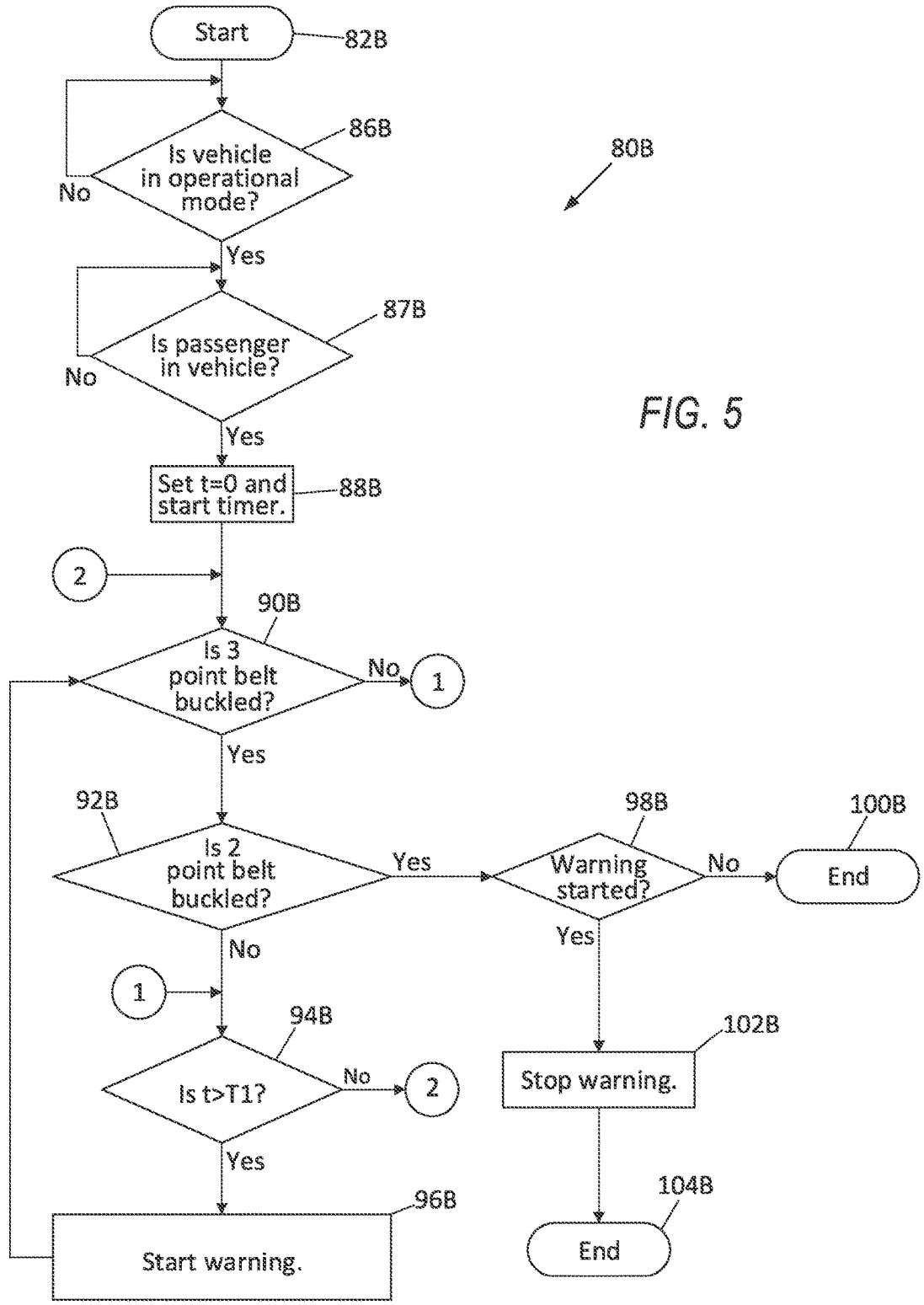
FIG. 5 is an example flow chart of a passenger's seat portion of a process to sound a reminder chime for a combined primary three-point seatbelt system and supplemental two-point seatbelt system.

FIGS. 4 and 5 respectively illustrate example processes 80A and 80B that may be included in program instructions stored in ECU 52 of vehicle 12. ECU 52 executes the steps illustrated in FIGS. 4 and 5 as described below, i.e., a description of a block executing an action or step means that the ECU 52 is executing the action or step according to its stored program instructions. A computer program for executing process 80A may be instantiated in start block 82A, e.g., when a power-on command is issued, as may be associated with the vehicle 12 being powered up responsive to an approach or a touch by a vehicle passenger.

From start block 82A, process 80A moves to decision block 84A. Decision block 84A determines whether an occupant, i.e., the driver, is in the driver's seat 14A. The presence of a driver may be determined as described above. When it is determined that the driver is not in the vehicle, process 80A continues to check for the presence of the driver. When it is determined that the driver is in the vehicle, i.e., that the driver's seat 14A is occupied, process 80A moves on to decision block 86A.

Decision block 86A determines whether the vehicle 12 is in the operational mode. When it is determined that the vehicle 12 is not in the operational mode, process 80A may continue to check until the vehicle is determined to be in the operational mode. Alternatively, when the vehicle 12 is not in the operational mode, process 80A may go back to decision block 84A to check that the driver is in the vehicle 12. Yet alternatively, decision blocks 84A and 86A may be more closely integrated, with a determination made that the driver is in the vehicle when the vehicle 12 is in the operational mode. When having the driver in the vehicle 12 is a necessary step to placing the vehicle 12 in the operational condition, it may be simultaneously determined that the driver is in the vehicle and that the vehicle is in an operational mode.

Process 80 may proceed to process block 88A after determining that the driver is in the vehicle 12 and that the vehicle is in the operational mode. Process block 88A resets a timer to a predetermined start value, e.g., zero, and starts the timer. Process 80A then moves to decision block 90A.

Decision block 90 determines whether the three-point seatbelt 28A is buckled, i.e., that the latch plate 32A is in engagement with the buckle 36A, using data from the sensor 58A in buckle 36A. When decision block 90A determines that the three-point seatbelt 28A is not buckled, i.e., unbuckled, process 80A skips decision block 92A and moves to decision block 94A. When decision block 90A determines that the three-point seatbelt 28A is buckled, process 80A continues to decision block 92A.

Decision block 92A determines whether the two-point seatbelt 41A is buckled using data from the buckle sensor 60A. When the seatbelt 41A is found to be unbuckled, process 80A moves to decision block 94A.

Decision block 94A determines whether the timer has been activated for a time t more than a predetermined time, i.e., a time period, of T1. An example time period T1 is four seconds. When it is determined that the time lapsed (t) is greater than time T1, process 80A moves to process block 96A. Process block 96A triggers, i.e., starts, the warning which, as noted above, may include an audible chime. Following process block 96A, process 80A moves back to decision block 90A to continue checking on whether both seatbelts 28A and 41A are buckled. When it is determined by decision block 94A that time T1 has not yet lapsed, process 80A moves back to decision block 90A to continue checking on whether both seatbelts 28A and 41A are buckled without starting the warning.

When decision block 92A determines that the two-point seatbelt 41A is buckled, i.e., that both seatbelts 28A and 41A are buckled, process 80A moves on to decision block 98A. Decision block 98A determines whether the warning has started. When it has not started, process 80A moves to end block 100A and terminates. When it is determined by block 98A that the warning has started, process 80A moves to process block 102A where the warning is stopped. Process 80A then moves on to end block 104A and terminates.

Process 80B for managing the buckle warning for the passenger's seat 14B is substantially the same as process 80A, differing in that process 80B includes the step 87B of checking whether an occupant is in the vehicle 12, and in the elimination of the step of expressly checking for the presence of the driver. As noted above, the presence of the driver may be implicit when the vehicle 12 is in the operational mode. Additionally, while process 80B illustrates checking for an occupant in the passenger's seat 14B after confirming that the vehicle is in the operational mode, those steps 86B, 87B may be reversed.

Processes 80A and 80B may be executed in parallel. Executing the processes 80A and 80B in parallel may reduce the time for which the warning is provided.

CONCLUSION

An example system and method for providing supplemental seatbelt restraint of vehicle occupants has been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to ECUs in the present description, computing devices such as those discussed herein generally each include instructions executable by one or more computing devices such as those identified above, and for carrying out blocks or steps of processes described above. For example, process blocks discussed above are embodied as computer executable instructions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising:
    a seat with a three-point seatbelt and a two-point seatbelt, the three-point seatbelt having a first switch, the two-point seatbelt having a second switch;
    the three-point seatbelt including a continuous webbing extending between a first latch plate and an anchor;
    a buckle disposed on the webbing between the first latch plate and the anchor, the buckle being closer to the first latch plate than the anchor;
    a second latch plate fixed to the two-point seatbelt and engageable with the buckle; and
    a computing device, programmed to:
        determine that the seat is occupied;
        determine that the three-point seatbelt of the seat is one of buckled and unbuckled based on a condition of the first switch;
        determine that the two-point seatbelt of the seat is one of buckled and unbuckled based on a condition of the second switch;
        initiate a warning signal upon determining that one of the seatbelts is unbuckled and the seat is occupied; and
        terminate the warning signal upon determining that both of the seatbelts are buckled based on the conditions of the first switch and the second switch and that the signal has been initiated.

2. The system of claim 1, wherein the computing device is further programmed to determine that a vehicle in which the seat is disposed is in an operational mode prior to determining that the seatbelts are one of buckled and unbuckled.

3. The system of claim 2, wherein the computing device is further programmed to initiate the warning signal only after a lapse of a predetermined time between determining that the vehicle is in an operational mode and that one of the seatbelts is unbuckled.

4. The system of claim 1, wherein the computing device is further programmed to:
    determine that a second seat is occupied;
    determine that a three-point seatbelt of the second seat is one of buckled and unbuckled;
    determine that a two-point seatbelt of the second seat is one of buckled and unbuckled;
    initiate a warning signal upon determining that one of the seatbelts of the second seat is unbuckled and the second seat is occupied when the warning signal has not already been initiated; and
    terminate the warning signal upon determining that both of the seatbelts of both of the seats are buckled and that the signal has been initiated.

5. The system of claim 4, wherein the computing device is further programmed to determine that a vehicle in which the seats are disposed is in an operational mode prior to determining that the seatbelts are one of buckled and unbuckled.

6. The system of claim 5, wherein the computing device is further programmed to initiate the warning signal only after a lapse of a predetermined time between determining that the vehicle is in an operational mode and that one of the seatbelts is unbuckled.

7. A method of determining and responding to a condition of seatbelts of a vehicle, the method comprising the steps of:
    determining that a first seat is occupied;
    determining that a three-point seatbelt of the first seat is one of buckled and unbuckled based on a condition of a first switch, the three-point seatbelt having a continuous webbing extending between an anchor and a latch plate;
    determining that a two-point seatbelt of the first seat is one of buckled and unbuckled based on a condition of a second switch disposed in a buckle, the buckle disposed on the webbing between the latch plate and the anchor, the buckle being closer to the first latch plate than the anchor;
    initiating a warning signal upon determining that one of the seatbelts is unbuckled and the seat is occupied; and
    terminating the warning signal upon determining that both of the seatbelts are buckled based on the conditions of the first switch and the second switch and that the signal has been initiated.

8. The method of claim 7, further comprising the step of determining that the vehicle is in an operational mode prior to determining that the seatbelts are one of buckled and unbuckled.

9. The method of claim 8, further comprising the step of initiating the warning signal only after a lapse of a predetermined time between determining that the vehicle is in an operational mode and that one of the seatbelts is unbuckled.

10. The method of claim 7, further comprising the steps of:
    determining that a second seat is occupied;
    determining that a three-point seatbelt of the second seat is one of buckled and unbuckled;
    determining that a two-point seatbelt of the second seat is one of buckled and unbuckled;
    initiating a warning signal upon determining that one of the seatbelts of the second seat is unbuckled and the second seat is occupied when the warning signal has not already been initiated; and
    terminating the warning signal upon determining that both of the seatbelts of both of the seats are buckled and that the signal has been initiated.

11. The method of claim 10, further comprising the steps of further determining that the vehicle is in an operational mode prior to determining that the seatbelts are one of buckled and unbuckled.

12. The method of claim 11, further comprising the step of initiating the warning signal only after a lapse of a predetermined time between determining that the vehicle is in an operational mode and that one of the seatbelts is unbuckled.

13. A seatbelt system, comprising:
    a first seatbelt having a continuous webbing connected to a first retractor and an anchor;
    a first latch plate disposed on the webbing between the retractor and the anchor;
    a first buckle selectively receiving the first latch plate;
    a second seatbelt connected to a second retractor and to a second latch plate; and
    a second buckle disposed on the webbing between the first latch plate and the anchor, the second buckle being closer to the first latch plate than the anchor and selectively receiving the second latch plate; and a first seat having the first retractor disposed on a first side of the seat and the second retractor fixed to a seatback of the seat at a second side of the seat opposite the first side of the seat.

14. The seatbelt system of claim 13, further comprising:
a switch disposed in the second buckle and the switch having a first condition when the second buckle is in receipt of the second latch plate and having a second condition when the second buckle is not in receipt of the second latch plate; and
a wireless transmitter disposed in the second buckle and electrically connected to the switch to transmit data indicative of the condition of the switch.

15. The seatbelt system of claim 13, further comprising:
a first switch disposed in the first buckle and the first switch having a first condition when the second buckle is in receipt of the first latch plate and having a second condition when the first buckle is not in receipt of the second latch plate; and
a second switch disposed in the second buckle and the switch having a first condition when the second buckle is in receipt of the second latch plate and having a second condition when the second buckle is not in receipt of the second latch plate.

16. The seatbelt system of claim 15, further comprising:
the first seat having the anchor disposed on the first side of the seat and the first buckle disposed on the second side of the seat;
a computing device, programmed to:
  determine that the first seat is occupied;
  based on the condition of the first switch determine that the first seatbelt is one of buckled and unbuckled;
  based on the condition of the second switch determine that the second seatbelt is one of buckled and unbuckled;
  initiate a warning signal upon determining that one of the seatbelts is unbuckled and the seat is occupied; and
  terminate the warning signal upon determining that both of the seatbelts are buckled and that the signal has been initiated.

17. The seatbelt system of claim 16, the computing device being further programmed to determine that a vehicle in which the seat is disposed is in an operational mode prior to determining that the seatbelts are one of buckled and unbuckled.

18. The seatbelt system of claim 17, the computing device being further programmed to initiate the warning signal only after a lapse of a predetermined time between determining that the vehicle is in an operational mode and that one of the seatbelts is unbuckled.

19. The seatbelt system of claim 16, further comprising:
a second seat having a first anchor and a first retractor disposed on a first side of the second seat and a first buckle disposed on a second side of the second seat and a second retractor fixed to a seatback of the second seat; and
the computing device, programmed to:
  determine that the second seat is occupied;
  based on a condition of a first switch disposed in the first buckle of the second seat, determine that the first seatbelt is one of buckled and unbuckled;
  based on a condition of a second switch disposed in the second buckle of the second seat, determine that the second seatbelt is one of buckled and unbuckled;
  initiate a warning signal upon determining that one of the seatbelts is unbuckled and the seat is occupied; and
  terminate the warning signal upon determining that both of the seatbelts are buckled and that the signal has been initiated.

20. The seatbelt system of claim 13, wherein the second buckle is slidably disposed on the webbing.

* * * * *